(12) United States Patent
Amstibovitsky et al.

(10) Patent No.: US 8,465,232 B2
(45) Date of Patent: Jun. 18, 2013

(54) CUTTING TOOL HAVING A RETRACTABLE NOZZLE

(75) Inventors: Leonid Amstibovitsky, Haifa (IL); Grigori Neiman, Kiryat Ata (IL)

(73) Assignee: Iscar, Ltd., Tefen (IL)

( * ) Notice: Subject to any disclaimer, the term of this patent is extended or adjusted under 35 U.S.C. 154(b) by 826 days.

(21) Appl. No.: 12/688,574

(22) Filed: Jan. 15, 2010

(65) Prior Publication Data
US 2010/0196105 A1 Aug. 5, 2010

(30) Foreign Application Priority Data
Feb. 17, 2009 (IL) .......................................... 197095

(51) Int. Cl.
*B23B 27/10* (2006.01)
*B23Q 11/10* (2006.01)

(52) U.S. Cl.
USPC .................................. 407/11; 408/56; 408/61

(58) Field of Classification Search
USPC ........................ 407/11, 102, 103; 408/56–59
IPC .................................. B23Q 11/10; B23B 27/10
See application file for complete search history.

(56) References Cited

U.S. PATENT DOCUMENTS

| | | | | |
|---|---|---|---|---|
| 3,335,959 A | | 8/1967 | Lockwood | |
| 4,621,547 A | * | 11/1986 | Yankoff | 82/1.11 |
| 4,778,315 A | * | 10/1988 | Duffy et al. | 409/136 |
| 4,848,198 A | * | 7/1989 | Royal et al. | 82/1.11 |
| 5,148,728 A | * | 9/1992 | Mazurkiewicz | 82/1.11 |
| 5,697,739 A | * | 12/1997 | Lewis et al. | 409/230 |
| 6,045,300 A | * | 4/2000 | Antoun | 407/11 |
| 6,123,270 A | * | 9/2000 | Hara | 239/8 |
| 6,126,368 A | * | 10/2000 | Daubinger et al. | 408/61 |
| 6,299,388 B1 | | 10/2001 | Slabe | |
| 6,443,672 B1 | * | 9/2002 | Lagerberg | 407/2 |
| 6,705,805 B2 | * | 3/2004 | Lagerberg | 407/11 |

(Continued)

FOREIGN PATENT DOCUMENTS

| | | |
|---|---|---|
| DE | 196 34 062 | 2/1998 |
| DE | 19634062 A1 * | 2/1998 |

(Continued)

OTHER PUBLICATIONS

Official Action dated Jun. 12, 2012 issued in European counterpart application (No. 10705442.1).

(Continued)

*Primary Examiner* — Andrea Wellington
*Assistant Examiner* — Sara Addisu
(74) *Attorney, Agent, or Firm* — Womble Carlyle

(57) ABSTRACT

A cutting tool includes a coolant conveying member, to provide coolant fluid to a cutting area during a cutting operation. The coolant conveying member includes a member body having a fluid passage formed therein, and a nozzle to convey and to jet out the coolant fluid therethrough. The nozzle is shiftable relative to the member body, between a first, extended position and a second, retracted position. In the extended position, for example, assumed during the cutting operation—the nozzle extends out and forwardly from the member body, stabilized by the continuous flow of coolant fluid therethrough, forcing the nozzle forwardly. In the retracted position, for example, assumed when the when the coolant fluid does not flow through the coolant conveying member, or flows at a very low rate, the nozzle may be at least partially accommodated in the fluid passage, to allow, for example, indexing or replacing of the cutting insert.

23 Claims, 4 Drawing Sheets

U.S. PATENT DOCUMENTS

| | | |
|---|---|---|
| 7,537,422 B2 | 5/2009 | Ballas et al. |
| 7,637,187 B2 * | 12/2009 | Zurecki et al. ............... 82/1.11 |
| 2002/0127067 A1 * | 9/2002 | Lagerberg .................... 407/11 |
| 2005/0169718 A1 * | 8/2005 | Beckington .................. 408/61 |
| 2006/0123801 A1 | 6/2006 | Jackson |
| 2007/0081867 A1 * | 4/2007 | Murakami et al. ............ 407/11 |
| 2011/0305531 A1 * | 12/2011 | Amstibovitsky et al. ...... 407/11 |
| 2012/0082518 A1 * | 4/2012 | Woodruff et al. ............. 407/11 |
| 2012/0230780 A1 * | 9/2012 | Henry et al. .................. 407/11 |
| 2013/0051934 A1 * | 2/2013 | Henry et al. .................. 407/11 |

FOREIGN PATENT DOCUMENTS

| | | |
|---|---|---|
| EP | 1 640 091 | 3/2006 |
| IL | 181834 | 4/2011 |
| JP | 07266104 A * | 10/1995 |
| JP | 07266105 A * | 10/1995 |
| JP | 08257807 A * | 10/1996 |
| JP | 2003071608 A * | 3/2003 |
| JP | 2005066795 A * | 3/2005 |
| JP | 2005081459 A * | 3/2005 |
| JP | 2010179412 A * | 8/2010 |

OTHER PUBLICATIONS

Official Action dated Apr. 29, 2012 issued in Israeli counterpart application (No. 197095).
International Search Report in PCT/IL2010/000062, dated Apr. 1, 2010.

* cited by examiner

CUTTING TOOL HAVING A RETRACTABLE NOZZLE

FIELD OF THE INVENTION

The present invention relates to a cutting tool having a coolant conveying member to convey coolant fluid to a cutting area, the coolant conveying member having a retractable nozzle.

BACKGROUND OF THE INVENTION

During performance of intensive metal cutting operations, for example, during turning of hard metals, a cutting insert performing the operation accumulates excessive amounts of heat, due to the continuous interaction with the machined work-piece. Without means for expelling the excessive heat, the cutting insert gradually risks, for example, deforming and eventually damaging the work-piece.

A well known solution to the above problem includes providing a continuous flow of coolant fluid to the cutting area, during the cutting operation. The coolant fluid can be supplied to the cutting area, for example, using a coolant conveying member—which may either be formed integrally in the body of the cutting tool, or include a separate unit which is externally attached to the body of the cutting tool. The coolant conveying member usually includes a nozzle that protrudes out from the body of the coolant conveying member, extending over the cutting insert, e.g., to the proximity of the cutting edge, in order to guide and jet out therethrough coolant fluid, generally directly and precisely on the cutting area. The provision of coolant fluid through such a coolant conveying member contributes, for example, to efficiently expel large amounts of heat accumulated in the cutting area, and additionally obtains desired breaking of work-piece chips formed during the cutting operation, improving the surface quality of the work-piece being machined.

However, by extending over the cutting insert, the nozzle blocks access to a clamping component that secures the cutting insert in place, and impedes the releasing of the clamping component, thus complicating the indexing or replacing of the cutting insert.

Therefore, in order to obtain access to the clamping component securing the cutting insert in place, some cutting tools, e.g., which include an separate coolant conveying member that is removably attached to the cutting tool, require dismounting and complete removal of the coolant conveying member from its operating position. Other cutting tools, e.g., including a coolant conveying member integrally formed therein, have special arrangements for securing the cutting insert in place, which allow comfortable access to the clamping component in presence of the coolant conveying member. However, these clamping arrangements provide the cutting insert with inappropriate securing, and may be inadequate, for example, for intensive cutting operations, which require significantly solid securing of the cutting insert.

SUMMARY OF THE INVENTION

Some embodiments of the invention include a cutting tool having a shank portion, a head portion containing an insert pocket, the insert pocket having a cutting insert releasably retained therein, the cutting tool including a coolant conveying member to provide coolant fluid, e.g., directly and precisely to the area of interaction of the cutting insert and the machined work-piece ("the cutting area"). The coolant conveying member may either be formed integrally in the body of the cutting tool, or include a separate, detachable unit externally attached to the body of the cutting tool.

In some embodiments the coolant conveying member includes a member body, having a fluid passage internally formed therein, to receive and convey coolant fluid therethrough. The coolant conveying member additionally includes a retractable nozzle, engaged to the member body, to receive coolant fluid from the fluid passage, convey the coolant fluid through an inner passage formed therein, and jet out the coolant fluid through one or more nozzle outlets, formed, for example, at a forward end thereof. The nozzle has a longitudinal axis A and a rear portion, the fluid passage has an inlet portion for receiving coolant fluid into the fluid passage, and at least a lower portion of a rear surface formed in the rear portion forms an acute angle with the longitudinal axis A.

In some embodiments, the member body has a base portion and a mounting portion detachably connected thereto, and the nozzle is engaged at least to the mounting portion.

In some embodiments, the nozzle is shiftable relative to the member body, between a first, extended position and a second, retracted position.

In the first position—the nozzle protrudes and extends outwardly from the member body, e.g., to the general proximity of the cutting area. In this position, for example, at least a portion of the nozzle extends over a clamping component that secures the cutting insert in place. The nozzle assumes the first position, for example, during the cutting operation, e.g., as the coolant conveying member conveys coolant fluid to the cutting area. The nozzle can be stabilized in this position, for example, solely by continuous flow of coolant fluid therethrough, forcing the nozzle out and forwardly from the member body while flowing toward the one or more nozzle outlets.

In the second, retracted position—the nozzle is at least partially accommodated in the fluid passage of the member body, i.e., at least a portion of the nozzle that extends outwardly from the member body in the first position is accommodated in the fluid passage in the second position. The second position can be assumed, for example, when the cutting tool is at rest, and no coolant fluid flows through the coolant conveying member. In the second position, for example, no portion of the nozzle extends over the clamping component, e.g., in order to allow appropriate access thereto. The retracted nozzle thereby allows one to comfortably index or replace the cutting insert, e.g., without having to dismount or completely remove the coolant conveying member from the cutting tool, and without having to provide the cutting insert with inappropriate securing.

BRIEF DESCRIPTION OF THE DRAWINGS

For a better understanding of the present invention and to show how the same may be carried out in practice, reference will now be made to the accompanying drawings, in which.

Figure 1:
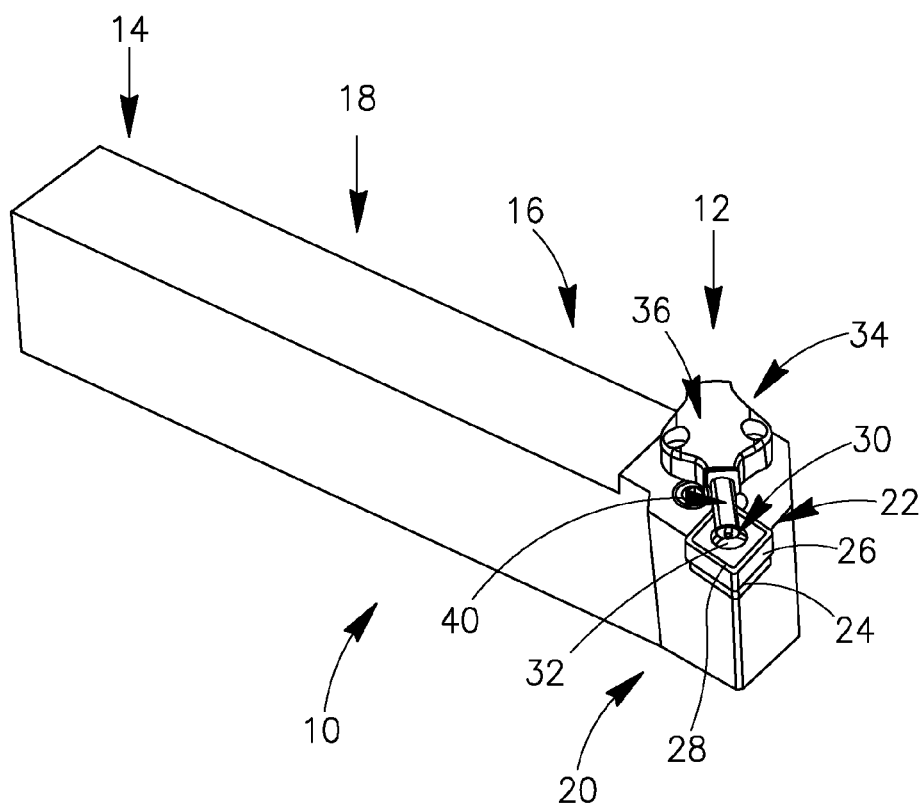
FIG. 1 is a perspective view of a cutting tool, having a coolant conveying member to convey coolant fluid therethrough, in accordance with some embodiments of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Although some drawings herein show a turning tool, the present invention is not limited in this respect. For example, embodiments of the invention may refer to other cutting tools, e.g., to grooving tools, parting tools, or to other metal cutting tools having one or more cutting inserts releasably retained therein.

Additionally, although some drawings herein show a cutting insert having a generally rhombic shape, the present invention is not limited in this respect. For example, embodiments of the invention may include, or may refer to cutting inserts having a generally triangular, square, rectangular, or parallelogramic shape, a generally polygonal shape, a generally circular shape, or other shapes.

Reference is made to FIG. 1, showing a cutting tool 10 in accordance with some embodiments.

In some embodiments, the cutting tool 10 has a forward end 12, a rear end 14, a tool body 16, a shank portion 18 and a head portion 20, the head portion 20 including a cutting portion 22. The cutting portion 22 includes an insert pocket 24 having a cutting insert 26 releasably retained therein. The cutting insert 26 includes a cutting edge 28 and a central bore 30, the central bore 30 having a clamping component 32, e.g., an insert screw, inserted therein to securely clamp the cutting insert 26 in the insert pocket 24.

The cutting tool 10 includes a coolant conveying member 34 to convey coolant fluid, e.g., to a cutting area, for example, in order to expel excessive heat accumulated therein. The coolant conveying member 34 includes a member body 36 to receive and convey therethrough coolant fluid, via a fluid passage 38 internally formed therein. The member body 36 may convey coolant fluid to a nozzle 40, movably engaged thereto, e.g., as described in detail below.

Reference is made to FIGS. 2-11, showing multiple portions of the cutting tool 10, according to a plurality of embodiments of the invention.

Figure 2:
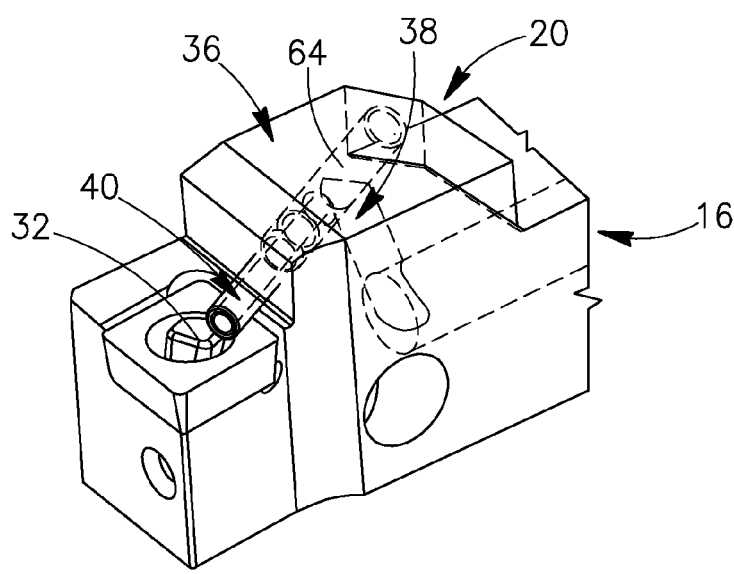
FIG. 2 is a perspective of a head portion of a cutting tool, including a coolant conveying member to convey coolant fluid therethrough, wherein the coolant conveying member is integrally formed in a body of the cutting tool, in accordance with other embodiments of the invention.
Figure 3:
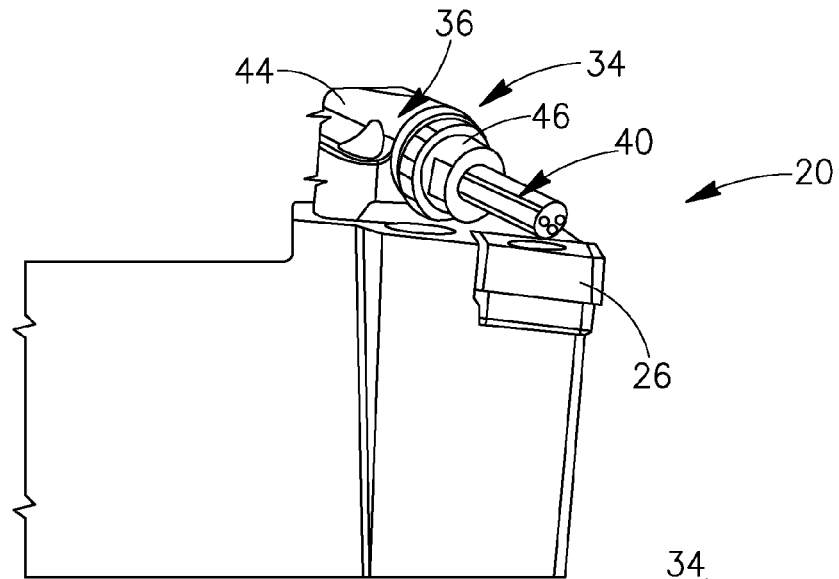
FIG. 3 is a side view of a head portion of a cutting tool, having a coolant conveying member for conveying coolant fluid therethrough, the coolant conveying member including a base portion and a mounting portion, in accordance with yet other embodiments of the invention.
Figure 4:
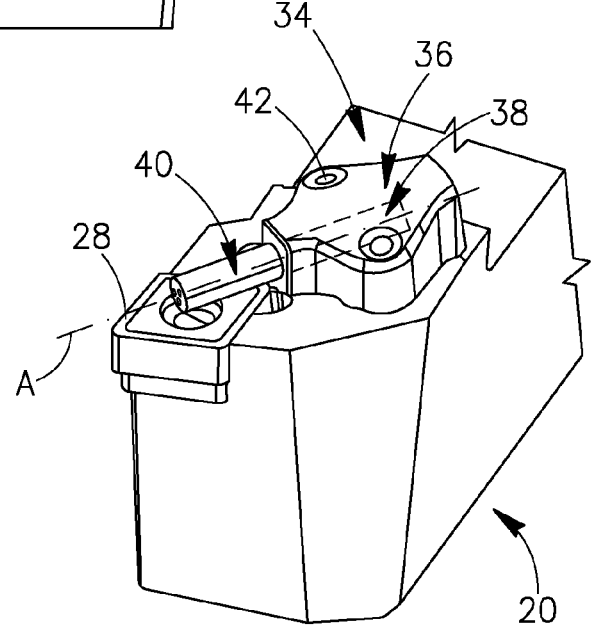
FIG. 4 is a perspective, top view of a head portion of the cutting tool shown in FIG. 1, wherein a nozzle of the coolant conveying member is in a first, extended position, in accordance with some embodiments of the invention.
Figure 5:
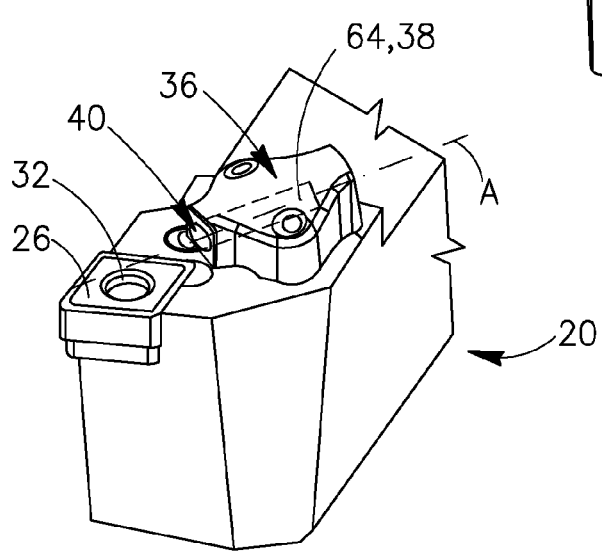
FIG. 5 is a perspective, top view of the head portion shown in FIG. 4, wherein the nozzle of the coolant conveying member is in a second, retracted position.
Figure 6:
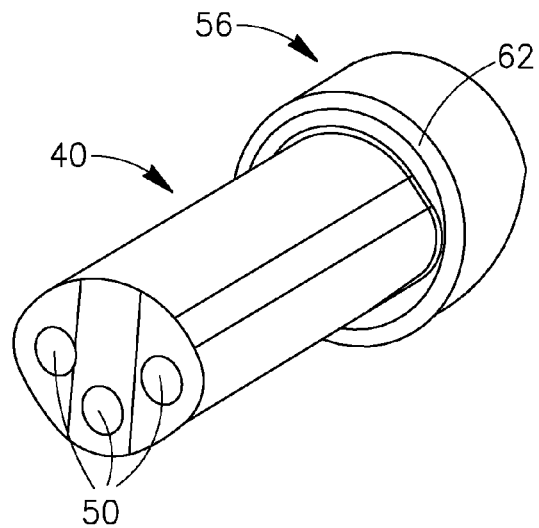
FIG. 6 is a perspective, front view of nozzle shown in FIG. 4.

In some embodiments, for example, as shown in FIG. 2, the member body 36 is formed integrally in the tool body 16. In other embodiments, for example, as shown in FIGS. 1, 4, and 5, the coolant conveying member 34 is a separate unit detachably attached to the tool body 16, e.g., using one or more securing screws 42 or other engagement means. In yet other embodiments, for example, as shown in FIG. 3, the member body 36 includes a base portion 44 and a mounting portion 46 detachably connected thereto, wherein the base portion 44 is either integrally formed in the tool body 16, or is a separate unit, externally attached to the tool body 16. In these yet other embodiments, the fluid passage 38 may either be formed in the mounting portion 46 alone, or extend through both the mounting portion 46 and the base portion 44. According to some of these embodiments, the mounting portion 46 is dismountable from the base portion 44, for example, to allow replacing of the mounting portion 46 with a different one, e.g., in order to comply with cooling requirements or other requirements required by the specific cutting operation performed. The member body 36 may convey coolant fluid to the nozzle 40 and the nozzle 40 may be movably engaged to the mounting portion 46.

Figure 7:
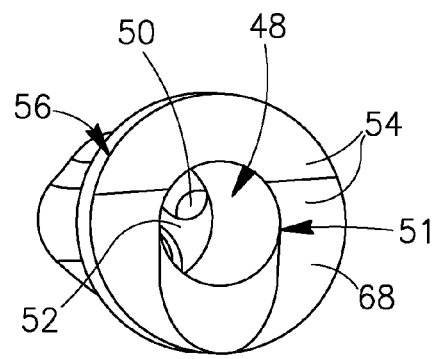
FIG. 7 is a rear view of the nozzle shown in FIG. 6.
Figure 8:
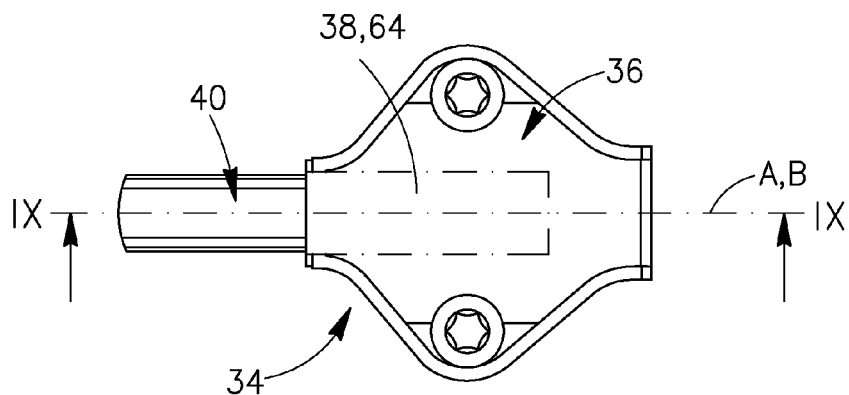
FIG. 8 is a top view of the coolant conveying member shown in FIG. 4.

In some embodiments, e.g., as shown in FIG. 7, the nozzle 40 includes an inner passage 48 internally formed therein to convey coolant fluid from the fluid passage 38 toward one or more nozzle outlets 50, the one or more nozzle outlets 50 formed, for example, at a front end of the nozzle 40, to jet out coolant fluid therethrough, e.g., directly on the cutting area. The nozzle 40 extends along a longitudinal axis A defining a forward-to-rear direction, e.g., as shown in FIGS. 4, 5, and 8. The nozzle 40 is movably engaged to the member body 36, and is shiftable relative thereto, e.g., along the axis A, between a first, extended position and a second, retracted position, as described in detail below. The member body 36 has a longitudinal axis B which also defines a forward-to-rear direction, and the nozzle 40 shifts along the longitudinal axis B as it moves between the first position and the second position. In some embodiments, the nozzle's longitudinal axis A is coincident with the member body's longitudinal axis B, at least when the nozzle 40 is in the first, extended position.

In some embodiments, in the first position, for example, shown in FIG. 4, the nozzle 40 protrudes generally out and forwardly from the member body 36, e.g., to a substantially maximal extent, positioning the one or more nozzle outlets 50 generally adjacent the cutting area. The nozzle 40 may assume the first position, for example, as the cutting tool 10 performs a cutting operation and coolant fluid is conveyed therethrough. The nozzle 40 can be stabilized in the first position, for example, solely by a continuous flow of coolant fluid therethrough, flowing toward the one or more nozzle outlets 50, as described below.

The nozzle 40 includes, for example, an inner front surface 52 formed at a front end of the inner passage 48, and a rearwardly facing rear surface 54 formed on a rear portion 56 of the nozzle 40. A nozzle inlet 51 is formed in the rear surface 54. The continuous flow of coolant fluid through the fluid passage 38 and into the inner passage 48 via the nozzle inlet 51 applies a substantially forward pressure on the inner front surface 52 and on the rear surface 54, both the surfaces being substantially transverse to the general direction of flow of the coolant fluid, at the respective areas of contact therewith.

The member body 36 has a front surface 57 having a front opening 59 formed therein. The front opening 59 communicates with a cavity 60 within the member body 36. In some embodiments, the nozzle 40 has a shape which allows it to be inserted into the cavity 60 via the front opening 59, while in other embodiments the nozzle 40 may be inserted via a member body rear opening 61. In some embodiments in which the member body 36 is detachable from the remainder of the cutting tool 10, the nozzle 40 may be placed in an appropriate location on the tool body 16 and the member body 36 placed thereover and secured to the tool body 16.

Figure 9:
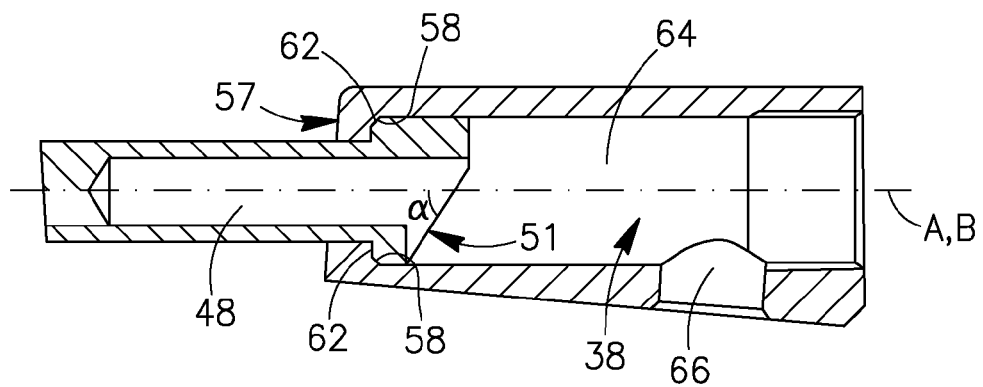
FIG. 9 is a cross section view of the coolant conveying member shown in FIG. 8, taken along the line IX-IX in FIG. 8.
Figure 10:
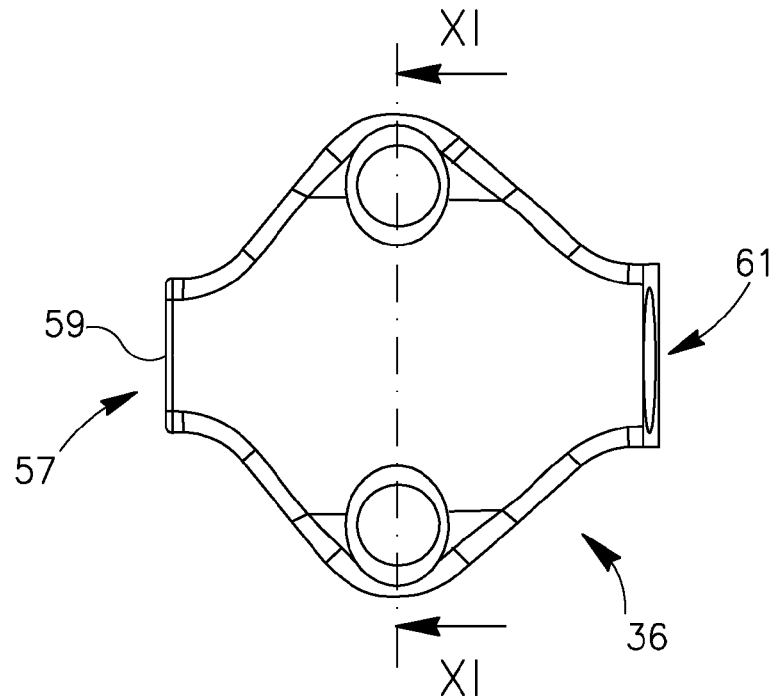
FIG. 10 is a top view of a member body of the coolant conveying member shown in shown in FIG. 8, in accordance with some embodiments of the invention.
Figure 11:
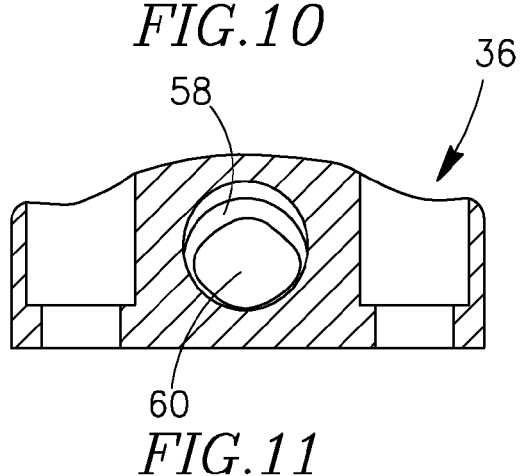
FIG. 11 is a cross section view of the member body shown FIG. 10, taken along the line XI-XI in FIG. 10, in accordance with some embodiments of the invention.

In some embodiments, the member body 36 includes a rearwardly facing internal front-end surface 58 which serves as a stop to arrest forward movement of the nozzle 40 when a coolant flows therethrough. In some embodiments, the perimeter of the nozzle's rear-portion 56 is larger, for example, than the front opening 59, e.g., in order to prevent the nozzle 40, when assuming the first position, from detaching from the member body 36. Thus, in the first position, coolant fluid forcing the nozzle 40 forwardly forces a forwardly facing, peripheral surface 62 formed on the rear-portion 56, into abutment with the rearwardly facing internal front-end surface 58, e.g., as shown in FIG. 9. The peripheral surface 62 and the front-end surface 58 assume, for example, complementary frusto-conical shapes, or other appropriate shapes, to abut one the other and obtain a substantially hermetical engagement therebetween. This substantially hermetical engagement may substantially prevent undesired leakage of coolant fluid through the cavity 60.

In some embodiments, in the second, retracted position, e.g., as shown in FIG. 5, the nozzle 40 is at least partially accommodated in a nozzle-accommodating portion 64 of the fluid passage 38. For example, at least a portion of the nozzle 40 that protrudes and extends out from the member body 36 in the first position, is accommodated in the nozzle-accommodating portion 64 in the second position. The second, retracted position can be assumed, for example, when the cutting tool 10 does not perform a cutting operation and coolant fluid does not flow through the coolant conveying member 34, or flows at a very low rate, for example, such that the force applied by the coolant is not sufficient to maintain the nozzle 40 in the extended position.

In the second position, the nozzle 40 may be either substantially entirely retracted into the nozzle-accommodating portion 64, or only partially, for example, to an extent allowing appropriate access to the clamping component 32. In some embodiments, the hind-portion 56 and the nozzle-accommodating portion 64 are generally complementary shaped, to allow sliding of the nozzle 40 through the nozzle-accommodating portion 64, e.g., between the extended position and the retracted position. When the coolant fluid does not flow through the coolant conveying member 34, or flows at a very low rate, the nozzle 40 may be pressed inwardly to assume the retracted position, for example, using one or more fingers.

In some embodiments, for example, when the nozzle 40 is in the retracted position, coolant fluid starting to flow through the fluid passage 38 forces out the nozzle 40, to slide forwardly through the nozzle-accommodating portion 64, to assume the extended position. In some embodiments, for example, as shown in FIG. 9, the fluid passage 38 includes an inlet portion 66 to receive coolant fluid into the fluid passage 38. Coolant fluid emerging from the inlet portion 66 enters into the inner passage 48 of the nozzle 40 via the nozzle inlet 51.

In some embodiments, the inlet portion 66 extends generally perpendicularly to the longitudinal axes A and B, for example, introducing coolant fluid in a generally upward direction into the body member 36, transverse to the longitudinal axes A of the nozzle 40 and B of the body member 36. Therefore, for example, in order to allow initial flow of coolant fluid from the inlet portion 66 into the nozzle 40 when it is in the retracted position, in some embodiments at least a lower portion 68 of the rear surface 54 is inclined with respect to the longitudinal axis A, for example, forming an acute angle α therewith, for example, a 45° angle, or other appropriate angle. This allows an initial portion of coolant fluid from the inlet portion 66 to pass through the nozzle inlet 51, formed at least partially in the lower portion 68 of the rear surface 54, and enter into the inner passage 48, e.g., when the nozzle is in the retracted position. In other embodiments, the inlet portion 66 is generally aligned with the nozzle 40, e.g., in case coolant fluid is supplied to the coolant conveying member 34 generally from behind.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting tool (10), comprising:
    a shank portion (18);
    a head portion (20) comprising an insert pocket (24), the insert pocket having a cutting insert (26) releasably retained therein, and
    a coolant conveying member (34), positioned adjacent the head portion, to provide coolant fluid to a cutting area, the coolant conveying member comprising:
        a member body (36) configured to receive and convey coolant fluid through a fluid passage (38) formed therein; and
        a nozzle (40), engaged to the member body, to convey and jet out therethrough coolant fluid received from the fluid passage, wherein the nozzle is shiftable relative to the member body between:
            a first position in which the nozzle extends outwardly and forwardly from the member body so as to at least partially extend over a clamping component (32) that secures the cutting insert in place; and
            a second position in which the nozzle is retracted in the fluid passage, such that at least a portion of the nozzle that extends outwardly from the member body in the first position is accommodated in the fluid passage in the second position, and no portion of the nozzle extends over the clamping component; wherein:
        the nozzle is stabilized in the first position by a continuous flow of coolant fluid therethrough, forcing the nozzle outwardly and forwardly from the member body.

2. The cutting tool of claim 1, comprising a tool body (16), the tool body comprising the head portion and the shank portion, wherein the member body (36) of the coolant conveying member (34) is integrally formed with the tool body.

3. The cutting tool of claim 1 comprising a tool body (16), the tool body comprising the head portion and the shank portion, wherein the member body (36) of the coolant conveying member (34) is a separate unit, detachable from the tool body.

4. The cutting tool of claim 1, wherein:
the member body (36) comprises a base portion (44) and a mounting portion (46) detachably connected thereto; and
the nozzle is engaged at least to the mounting portion.

5. The cutting tool of claim 1, wherein:
the nozzle comprises a longitudinal axis (A) and a rear portion (56);
the fluid passage comprises an inlet portion (66) for receiving coolant fluid into the fluid passage; and
at least a lower portion (68) of a rear surface (54) formed in the rear portion forms an acute angle with the longitudinal axis (A).

6. A cutting tool coolant conveying member (34) comprising:
a member body (36) configured to receive and convey coolant fluid via a fluid passage (38) formed therein; and
a nozzle (40), movably engaged to the member body, to convey and jet out therethrough coolant fluid received from the fluid passage, wherein the nozzle is shiftable relative to the member body between:
a first position in which the nozzle extends outwardly and forwardly from the member body, when coolant fluid passes therethrough; and
a second position in which the nozzle is retracted in the fluid passage, such that at least a portion of the nozzle that extends outwardly from the member body in the first position is accommodated in the fluid passage in the second position; wherein:
the nozzle is stabilized in the first position by a continuous flow of coolant fluid therethrough, forcing the nozzle outwardly and forwardly from the member body (36).

7. The cutting tool coolant conveying member (34) of claim 6, wherein:
the nozzle comprises a rear portion (56);
the fluid passage comprises an inlet portion (66) for receiving coolant fluid into the fluid passage; and
at least a lower portion (68) of a rear surface (54) of the rear portion forms an acute angle with a longitudinal axis (A) of the nozzle.

8. A cutting tool (10), comprising:
a cutting portion (22) comprising an insert pocket (24) having a cutting insert (26) releasably retained therein by a clamping component (32), and
a coolant conveying member (34) attached to the cutting tool (10) and configured to provide coolant fluid to a cutting area, the coolant conveying member (34) comprising:
a member body (36) configured to receive and convey coolant fluid through a fluid passage (38) formed therein; and
a nozzle (40) engaged to the member body and configured to convey and jet out therethrough coolant fluid received from the fluid passage, wherein the nozzle is shiftable between:
a first position in which the nozzle extends outwardly and forwardly from the member body so as to at least partially extend over the clamping component;
a second position in which the nozzle is at least partially retracted in the fluid passage, such that at least a portion of the nozzle that extends outwardly from the member body in the first position is accommodated in the fluid passage in the second position, and no portion of the nozzle extends over the clamping component; and wherein the nozzle is stabilized in the first position by a continuous flow of coolant fluid therethrough, forcing the nozzle outwardly and forwardly from the member body.

9. The cutting tool (10) of claim 8, further comprising:
a shank portion (18); and
a head portion (20) connected to the shank portion (18), wherein:
the cutting portion (22) is located on the head portion (20).

10. The cutting tool (10) of claim 8, wherein:
the nozzle (40) has a longitudinal axis (A);
the member body (36) has a longitudinal axis (B); and
the nozzle shifts along the member body's longitudinal axis (B) as it moves between the first position and the second position.

11. The cutting tool (10) of claim 9, wherein:
the nozzle's longitudinal axis (A) is coincident with the member body's longitudinal axis (B) in at least the first position.

12. The cutting tool (10) of claim 8, wherein:
the member body (36) includes a rearwardly facing internal front-end surface (58);
the nozzle (40) has a forwardly facing peripheral surface (62); and
when coolant is jetted out through the nozzle, the member body's rearwardly facing internal front-end surface (58) abuts the nozzle's forwardly facing peripheral surface (62), thereby preventing the nozzle (40) from detaching from the member body (36).

13. The cutting tool (10) of claim 8, wherein:
the cutting tool comprises a tool body (16); and
the member body (36) is integrally formed to have one-piece unitary construction with the tool body (16).

14. The cutting tool (10) of claim 8, wherein:
the cutting tool comprises a tool body (16); and
the member body (36) is a separate unit, detachable from the tool body (16).

15. The cutting tool (10) of claim 8, wherein:
the member body (36) comprises a base portion (44) and a mounting portion (46) detachably connected thereto; and
the nozzle (40) is engaged at least to the mounting portion.

16. The cutting tool (10) of claim 15, wherein:
the base portion (44) is integrally formed to have one-piece unitary construction with a tool body (16) of the cutting tool.

17. The cutting tool (10) of claim 15, wherein:
the base portion (44) is a separate unit, externally attached to a tool body (16) of the cutting tool.

18. The cutting tool (10) of claim 15, wherein:
the fluid passage (38) is formed in the mounting portion (46) alone.

19. The cutting tool (10) of claim 8, wherein:
the nozzle comprises a rear portion (56) having a rearwardly facing rear surface (54);
a lower portion (68) of the rear surface (54) forms an acute angle ($\alpha$) with a longitudinal axis (A) of the nozzle; and
a nozzle inlet (51) is formed at least partially in the lower portion (68) of the rear surface.

20. The cutting tool (10) of claim 19, wherein:
the fluid passage (38) comprises an inlet portion (66) which introduces coolant fluid into the fluid passage (38) in a direction transverse to a longitudinal axis (B) of the member body.

21. A cutting tool coolant conveying member (34) comprising:

a member body (36) configured to receive and convey coolant fluid through a fluid passage (38) formed therein; and a nozzle (40) engaged to the member body and configured to convey and jet out therethrough coolant fluid received from the fluid passage, wherein the nozzle is shiftable between:
- a first position in which the nozzle extends outwardly and forwardly from the member body;
- a second position in which the nozzle is at least partially retracted in the fluid passage, such that at least a portion of the nozzle that extends outwardly from the member body in the first position is accommodated in the fluid passage in the second position; and wherein the nozzle is stabilized in the first position by a continous flow of coolant fluid therethrough, forcing the nozzle outwardly and forwardly from the member body. nozzle is stabilized in the first position by a continuous flow of coolant fluid therethrough, forcing the nozzle outwardly and forwardly from the ember body.

22. The cutting tool coolant conveying member (34) of claim 21, wherein:
- the nozzle comprises a rear portion (56) having a rearwardly facing rear surface (54) and a nozzle inlet (51) formed at least partially in a lower portion (68) of the rear surface (54); and
- at least the lower portion of the rear surface forms an acute angle with a longitudinal axis (A) of the nozzle.

23. The cutting tool coolant conveying member (34) of claim 22, wherein:
- the fluid passage (38) comprises an inlet portion (66) which introduces coolant fluid into the fluid passage (38) in a direction transverse to a longitudinal axis (B) of the member body.

* * * * *